US 10,195,805 B2

(12) United States Patent
Schwelling

(10) Patent No.: US 10,195,805 B2
(45) Date of Patent: Feb. 5, 2019

(54) PRESSURE ROLLER FOR AN APPARATUS FOR COMPACTION OF EMPTY BEVERAGE CONTAINERS

(71) Applicant: Hermann Schwelling, Salem (DE)

(72) Inventor: Hermann Schwelling, Salem (DE)

( * ) Notice: Subject to any disclaimer, the term of this patent is extended or adjusted under 35 U.S.C. 154(b) by 1117 days.

(21) Appl. No.: 14/156,059

(22) Filed: Jan. 15, 2014

(65) Prior Publication Data
US 2014/0196616 A1 Jul. 17, 2014

(30) Foreign Application Priority Data

Jan. 16, 2013 (DE) .................. 10 2013 100 439

(51) Int. Cl.
B30B 3/00 (2006.01)
B30B 3/04 (2006.01)
B30B 9/32 (2006.01)
B02C 19/00 (2006.01)
B02C 4/08 (2006.01)
B02C 4/30 (2006.01)

(52) U.S. Cl.
CPC .............. B30B 3/005 (2013.01); B02C 4/08 (2013.01); B02C 4/30 (2013.01); B02C 19/0087 (2013.01); B02C 19/0093 (2013.01); B30B 3/045 (2013.01); B30B 9/325 (2013.01); Y02W 30/60 (2015.05)

(58) Field of Classification Search
CPC ............ B02C 19/0081; B02C 19/0087; B02C 19/0093; B02C 4/08; B02C 4/30; B02C 18/142; B02C 18/182; B02C 18/2275; B02C 18/144; B02C 18/145; B30B 9/325

USPC .......................................... 100/176; 241/187
See application file for complete search history.

(56) References Cited

U.S. PATENT DOCUMENTS 1,598,364 A    8/1926   Cassell et al.
1,910,852 A *  5/1933   Mosshart .................. B02C 4/08
                                                              241/222
4,781,331 A * 11/1988   Potts ........................ B02C 4/30
                                                              241/236
5,215,265 A *  6/1993   Lodovico ............ B02C 19/0087
                                                              241/158

(Continued)

FOREIGN PATENT DOCUMENTS

DE         85 15 290 U1    7/1985
DE        201 11 752 U1    6/2001
(Continued)

Primary Examiner — Jimmy T Nguyen
Assistant Examiner — Gregory Swiatocha
(74) Attorney, Agent, or Firm — Collard & Roe, P.C.

(57) ABSTRACT

A pressure roller for an apparatus for compaction of empty (disposable) hollow bodies (beverage containers), particularly plastic bottles or tin cans, having at least one rotating roller that is disposed at a distance from a counter-bearing, forming a gap, has an essentially cylindrical mantle surface that possesses multiple profiled partial regions of the same type and the same width in its working region, following one another in the axial direction. These profiled partial regions are separated from one another, in each instance, by a circumferential recess. Each of these profiled partial regions—viewed axially—has multiple sections that follow one another. At least one cam-shaped projection that projects radially away from the mantle surface is disposed in one of these sections.

14 Claims, 12 Drawing Sheets

(56) References Cited

U.S. PATENT DOCUMENTS

Figure 1:
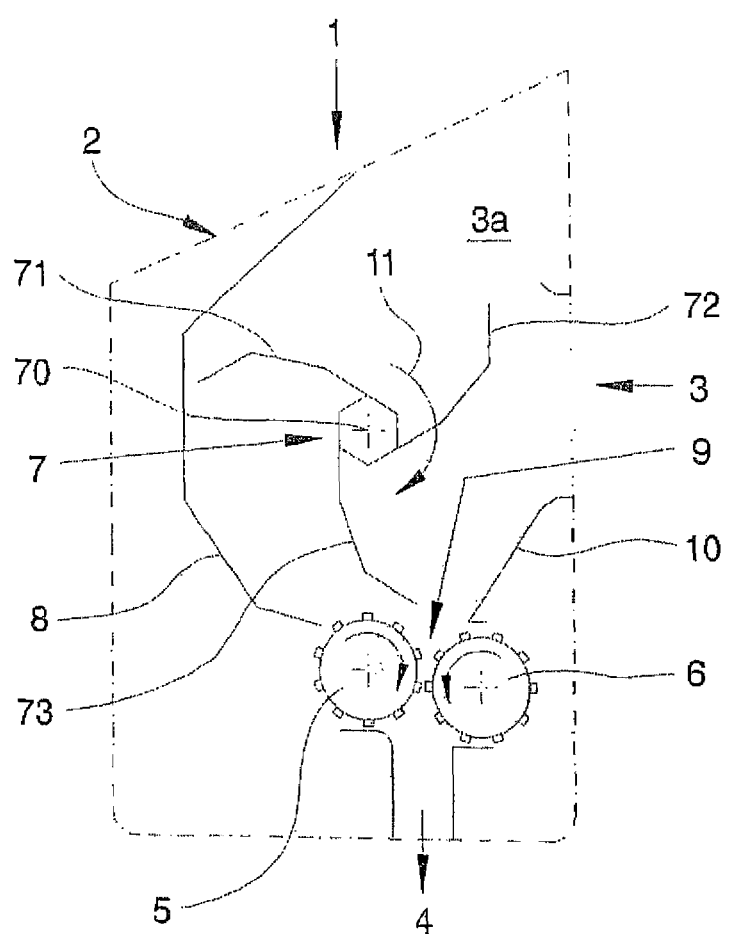

| | | | | |
|---|---|---|---|---|
| 5,400,977 | A | * | 3/1995 | Hayles, Jr. ............... B02C 13/20 241/154 |
| 5,511,729 | A | * | 4/1996 | Husain .................. B02C 18/182 241/166 |
| 5,560,552 | A | | 10/1996 | Powell et al. |
| 5,927,627 | A | * | 7/1999 | Edson ...................... B02C 4/08 241/159 |
| 5,947,396 | A | * | 9/1999 | Pierce .................... B02C 13/02 241/187 |
| 6,517,020 | B1 | * | 2/2003 | Smith ................... B02C 18/145 241/294 |
| 6,669,125 | B1 | * | 12/2003 | Howard .................. B02C 13/20 241/187 |
| 7,540,235 | B2 | | 6/2009 | Schwelling |
| 7,658,343 | B2 | * | 2/2010 | Potts ........................ B02C 4/18 241/158 |
| 2004/0118957 | A1 | * | 6/2004 | Papajewski ............... B02C 4/08 241/236 |
| 2005/0121549 | A1 | * | 6/2005 | Pierce ................... B02C 13/282 241/187 |
| 2006/0261202 | A1 | * | 11/2006 | Potts ........................ B02C 4/18 241/236 |
| 2012/0017782 | A1 | * | 1/2012 | Moch ....................... B26F 1/24 100/176 |

FOREIGN PATENT DOCUMENTS

| | | | | |
|---|---|---|---|---|
| DE | 203 16 366 U1 | | 4/2005 | |
| DE | 103 25 368 B4 | | 3/2006 | |
| DE | 10 2008 057 137 B4 | | 1/2011 | |
| EP | 2 292 333 A2 | | 3/2011 | |
| JP | 3025701 U | * | 6/1996 | ............ B30B 9/325 |
| JP | H09-313972 A | | 12/1997 | |
| WO | WO 2005046875 A1 | * | 5/2005 | ............... B02C 4/18 |

* cited by examiner

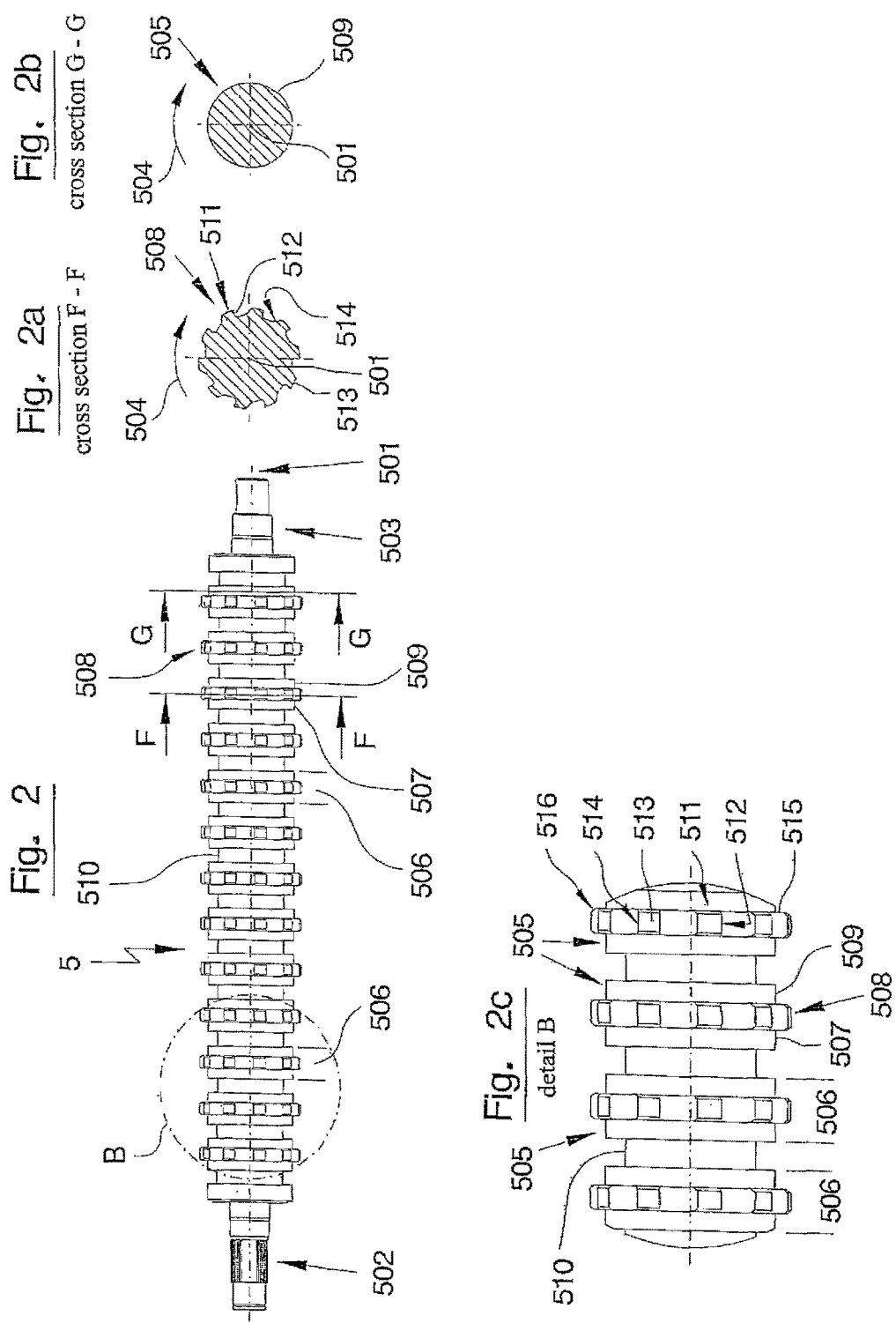

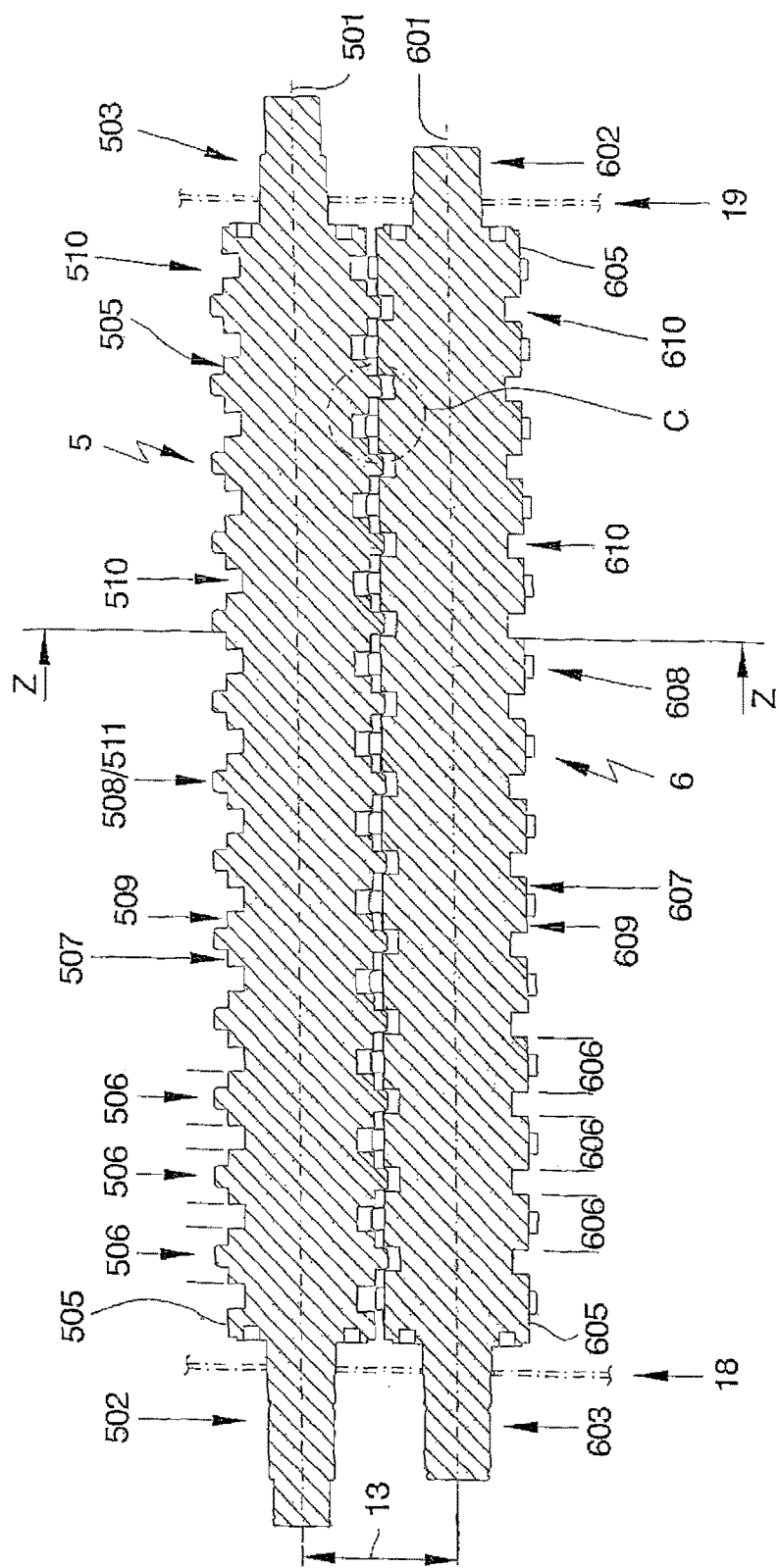

detail C cross section Z - Z cross section A - A detail D detail E detail C

PRESSURE ROLLER FOR AN APPARATUS FOR COMPACTION OF EMPTY BEVERAGE CONTAINERS

CROSS REFERENCE TO RELATED APPLICATIONS

Applicant claims priority under 35 U.S.C. § 119 of German Application No. 10 2013 100 439.3 filed on Jan. 16, 2013, the disclosure of which is incorporated by reference.

AREA OF APPLICATION

The invention relates to a pressure roller for an apparatus for compaction of empty containers, particularly beverage bottles or cans made of plastic, particularly PET, or tinplate.

Such pressure rollers and apparatuses having such pressure rollers are used to compact empty containers (hollow bodies), particularly those from the food sector, such as beverage bottles, cans, and similar containers. Thus, the transport volume of the vehicle is better used for transport to recycling facilities; the transport costs are reduced. However, compacted containers are also advantageous for the recycling process itself.

TECHNICAL BACKGROUND

A compacting apparatus of the type stated is described in DE 85 15 290 U1. This apparatus possesses at least one roller for compressing and perforating empty containers, whereby spikes project radially from the basic body of the roller. The spikes are attached in radially oriented accommodations of the basic roller body.

In DE 103 25 368 B4, a compaction apparatus for beverage containers in the form of plastic bottles and (tin) cans is disclosed, in the form of two drivable rollers that run in opposite directions, are disposed parallel at a distance from one another, and configured in such a manner that empty containers are compressed between them and their mantle surfaces, which face the rollers, are partly cut into. For this purpose, each roller has multiple disks along a roller axis. One part of the disks is configured as a pressure disk, the other part of the disks is configured as a cutting disk. Furthermore, the rollers are disposed in such a manner that the cutting disks of the one roller engage into interstices between the disks of the other roller, in other words cutting disks mesh with one another. By means of a movement of the rollers in opposite directions, an empty container is drawn into the intake gap between the rollers and compressed by means of the plurality of pressure disks and cutting disks, and partly cut into. This particularly allows compaction also of empty, closed containers, before having to perforate them first.

On the market, there continues to be a demand for more efficient apparatuses of this type.

PRESENTATION OF THE INVENTION

Technical Task

Proceeding from the solutions according to the state of the art, an apparatus for compaction of empty hollow bodies, particularly (disposable) plastic bottles and metal cans (beverage containers), at least modules for such apparatuses, is/are supposed to be found, which apparatus brings about a reduction in the production costs as well as the operating costs during use, and particularly achieves a saving in energy; furthermore, the quality of the compressed hollow bodies/containers for the subsequent recycling process and the cancellation of disposable containers with deposit are supposed to be improved.

Solution for the Task

This task is accomplished by means of a pressure roller having the characteristics as described herein for an apparatus of the stated type, for compaction of (disposable) hollow bodies (beverage containers), particularly of plastic bottles or tin cans, or by means of such an apparatus, having a pressure roller according to the invention, and having the characteristics described herein.

Exemplary embodiments of the pressure roller according to the invention and of the apparatus according to the invention, respectively, are described.

The advantages of the invention consist, aside from the savings in production, such as, for example, production effort for the rollers, fewer strippers, assembly effort of the apparatus and energy saving, also in lowering of the operating costs for the user, particularly by means of an energy saving of up to 50%, by means of reduced maintenance effort, and, among other things, also by means of reduced wear of the rollers.

Furthermore, the compressed bodies have greater shape stability, so that during the subsequent recycling process, fewer disruptions in conveying of the compressed bodies occur; in the recycling machines themselves and also toward the recycling machines. Furthermore, during compression of the containers, bent edges with a small radius in their compressed body wall and bottom are avoided, to a great extent, so that the number of cracks in the materials, in other words in the body walls of the containers, is significantly reduced. At the same time, however, it is guaranteed that the cancellation of deposit containers is reliable, in other words the bar code affixed to the containers/hollow bodies is cancelled.

A preferred embodiment of the invention is a newly configured pressure roller that is profiled in a new way in the periphery of its working region, in other words in its mantle surface. This newly configured pressure roller is provided for an apparatus for compaction of empty (disposable) hollow bodies (beverage containers), particularly plastic bottles or tin cans. This pressure roller according to the invention is the at least one rotatable roller in the said apparatus, which is disposed at a distance from a counter-bearing, forming a gap. The gap is disposed parallel to the axis of the first pressure roller. Initially, this gap is the intake gap, then—directly between the pressure roller and the counter-bearing—it is the working gap, and finally, it is the exit gap, which opens into an exit opening provided in the housing of the apparatus.

The essentially cylindrical mantle surface of the basic roller body of this new pressure roller, in a first embodiment variant, possesses multiple profiled partial regions of the same type and the same width in its working region, in the axial direction, whereby these profiled partial regions are separated from one another, in each instance, by a circumferential recess in the basic roller body, which interrupts the mantle surface. Furthermore, each of these profiled partial regions—viewed axially—has multiple sections that follow one another, preferably a first, a second, and a third section. In one of these sections, at least one cam-shaped projection that projects radially away from the mantle surface is disposed. This section having a cam-shaped projection is preferably the center section.

Preferably, multiple cam-shaped projections are disposed in each related section, and are provided uniformly distributed on the circumference of these sections. These cam-shaped projections are simultaneously such that they are perforation elements.

A further preferred embodiment of this first pressure roller is such that the sections next to the section having the cam-shaped projection(s) are configured as pressure surfaces, in each instance. Preferably, these pressure surfaces have the same width, preferably equal to the width of the section having the cam-shaped projections, at least half the width as the section having the cam-shaped projections.

Each cam-shaped projection of the first pressure roller is configured—viewed in the direction of rotation of the roller—preferably in tooth shape. According to the invention, the head-side edge region of each projection, toward its side surface, in each instance, is an inclined, bevel-shaped slanted surface, which is significantly greater in its width than a normal edge bevel. Preferably, this bevel-shaped surface is at least greater than 0.8 mm wide and reaches maximally down to half the height of a cam-shaped projection.

According to another preferred embodiment, each cam-shaped projection of the pressure rollers according to the invention is also such that it simultaneously can be a breaking element for glass bottles.

Preferably, the pressure rollers according to the invention are produced from solid material and heat-treated steel, and their mantle surface, along with the projecting perforation elements, is at least surface-hardened.

A further embodiment of the invention is such that the slanted surface disposed in the head-side edge region of the cam-shaped projections in the basic embodiment of the invention, is now disposed on the edge region, in each instance, that is formed by the side flank of the circumferential recess in the mantle surface, in each instance, and the adjacent first section or the adjacent third section of each partial region of the working region of each pressure roller. In this way, the intake behavior, particularly in the case of plastic bottles and tin cans, is improved, because the additional pressure edges provided in the second embodiment of the invention, formed by longitudinal grooves, are quasi extended.

EXEMPLARY EMBODIMENTS

Figure 1A:
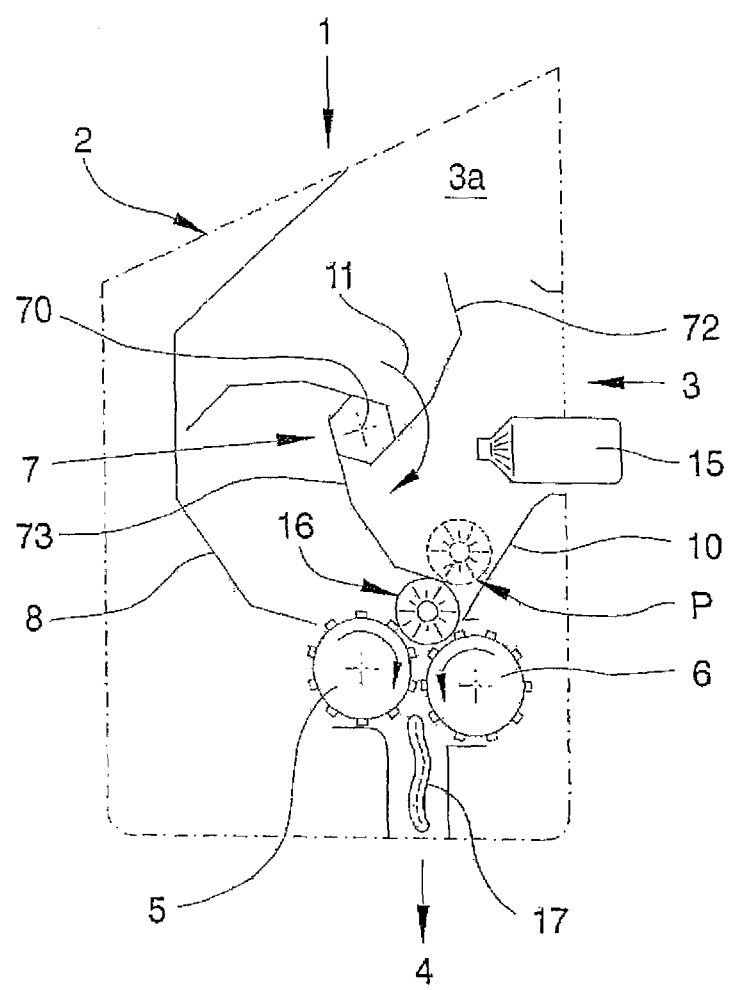
Figure 3A:
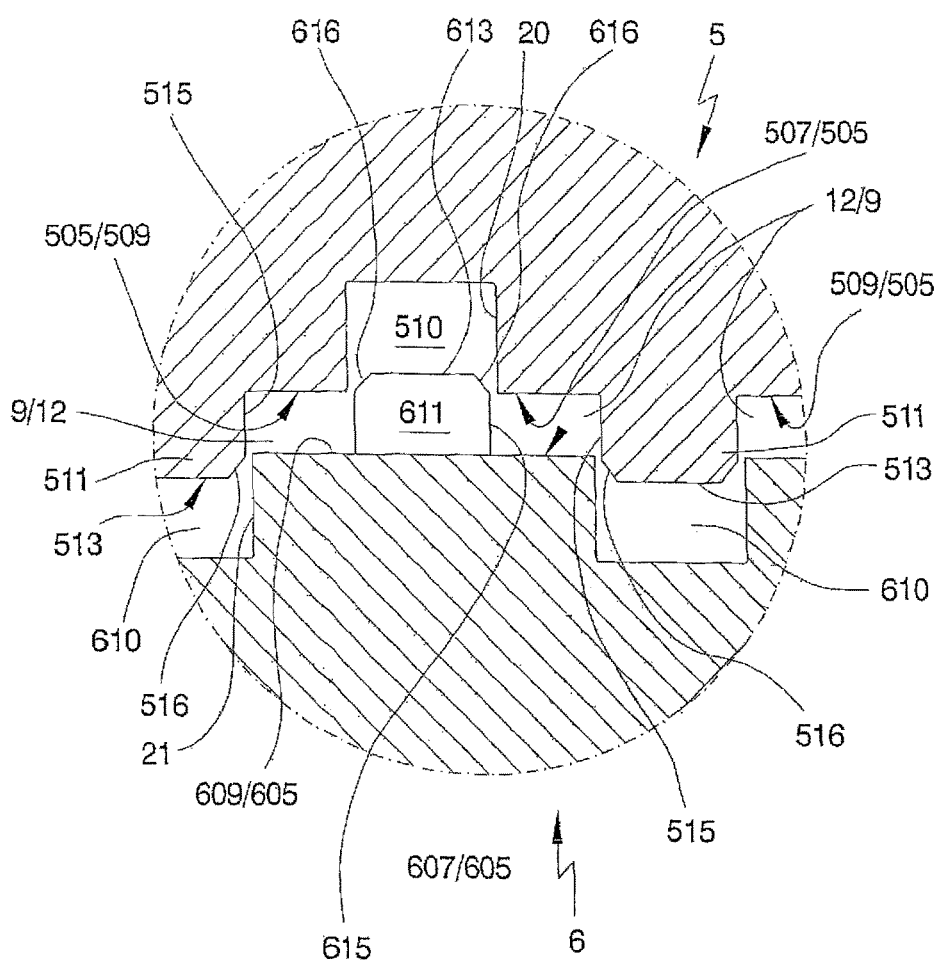
Figure 4:
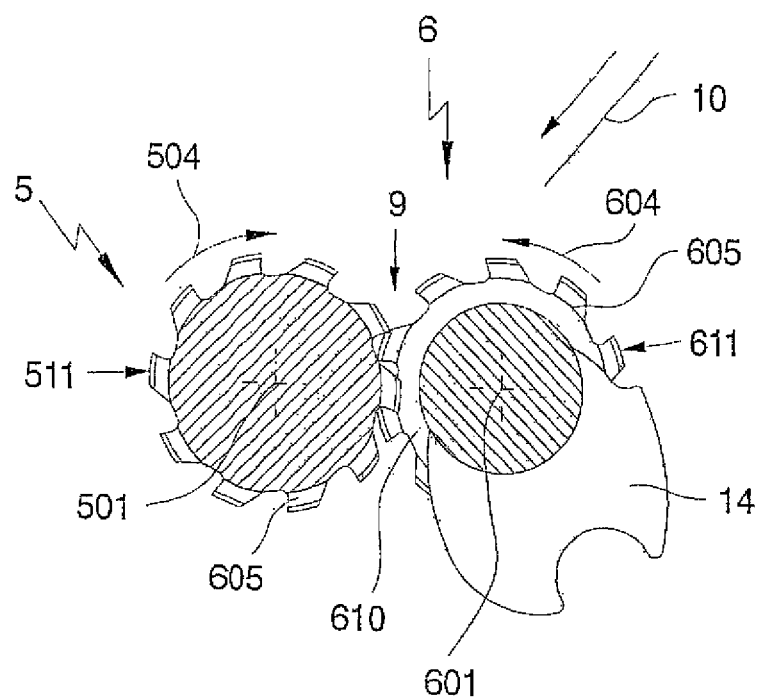
Figure 5:
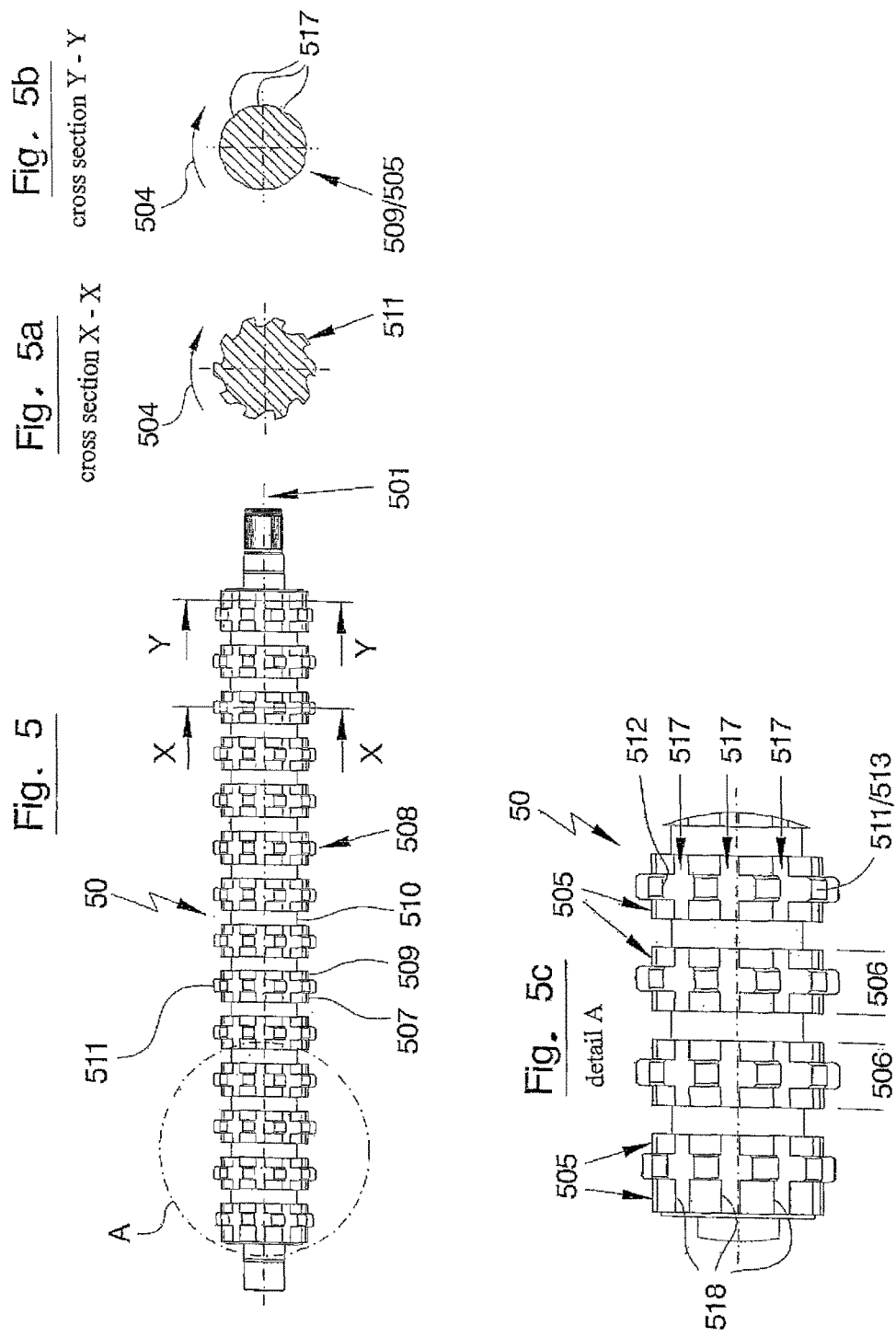
Figure 6:
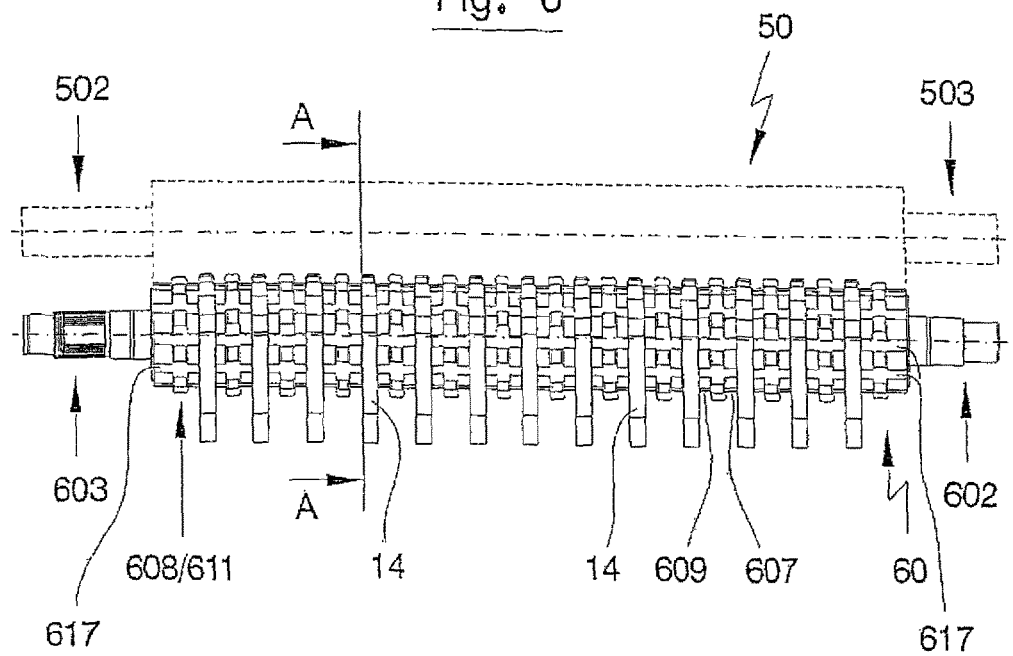
Figure 6A:
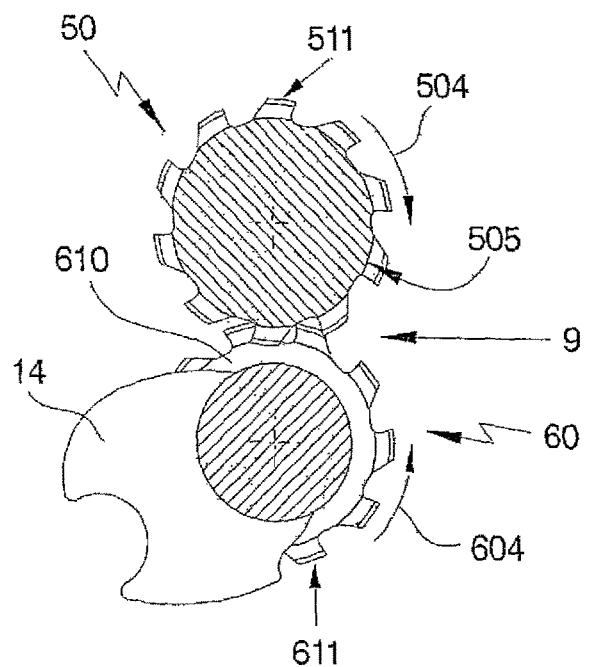
Figure 7:
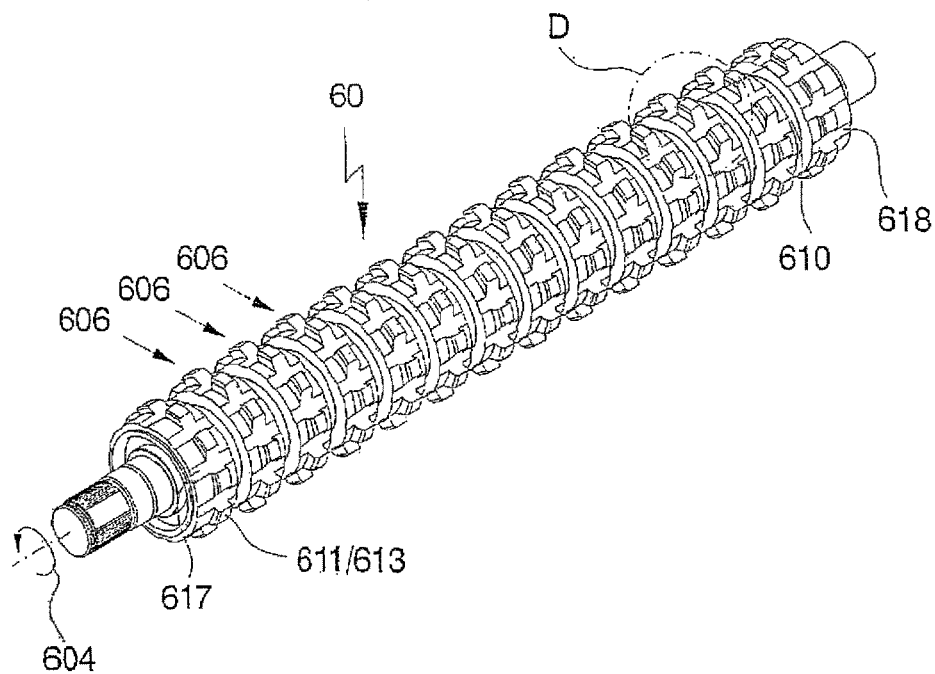
Figure 7A:
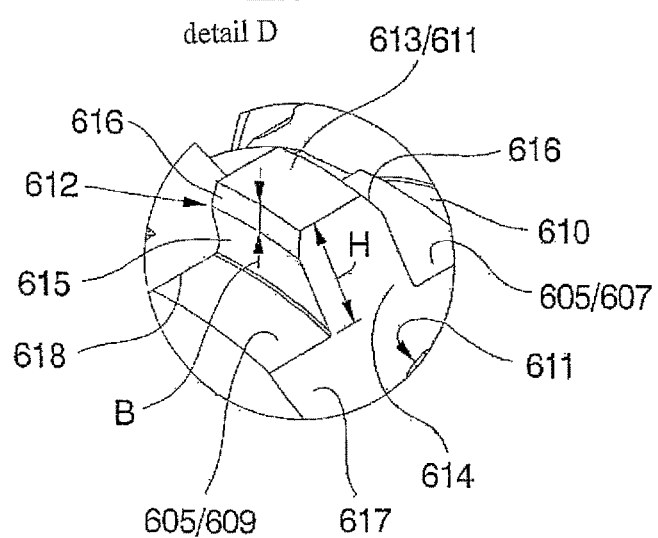
Figure 8:
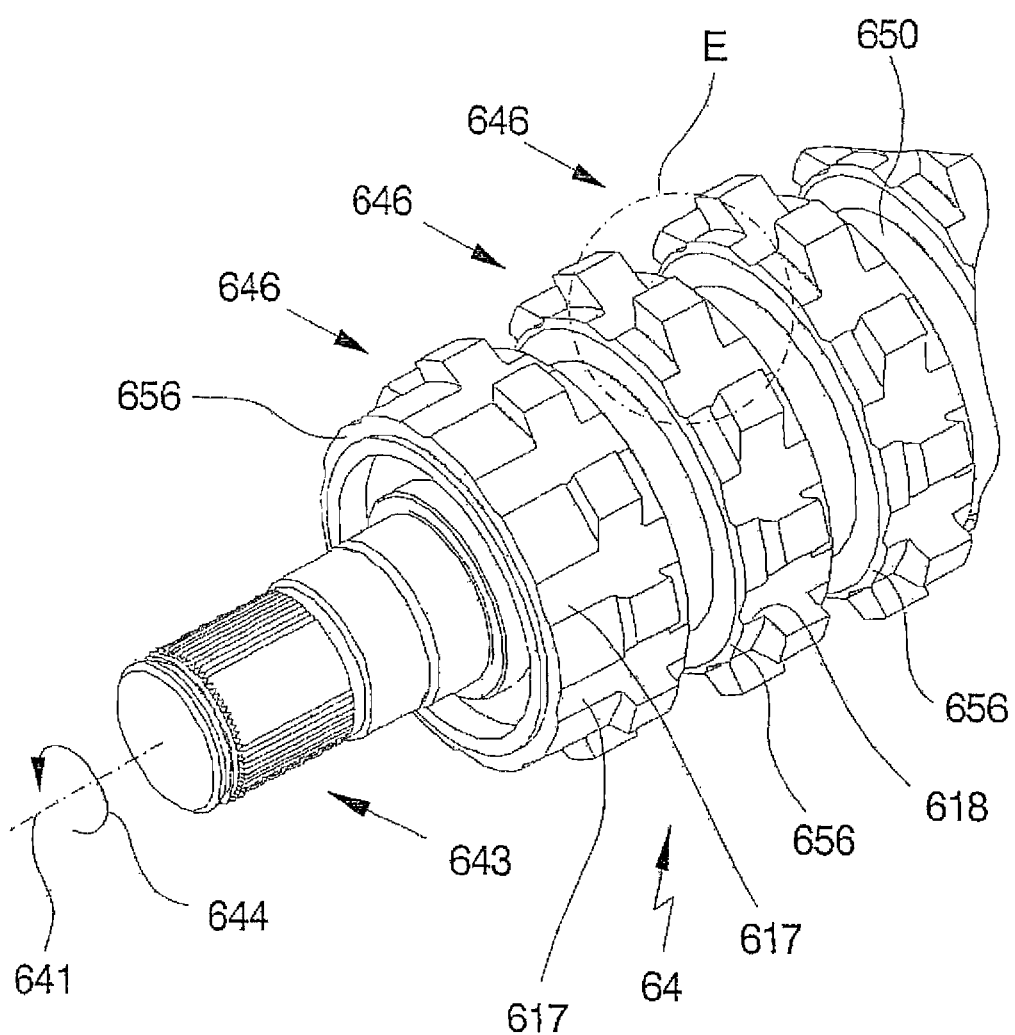
Figure 8A:
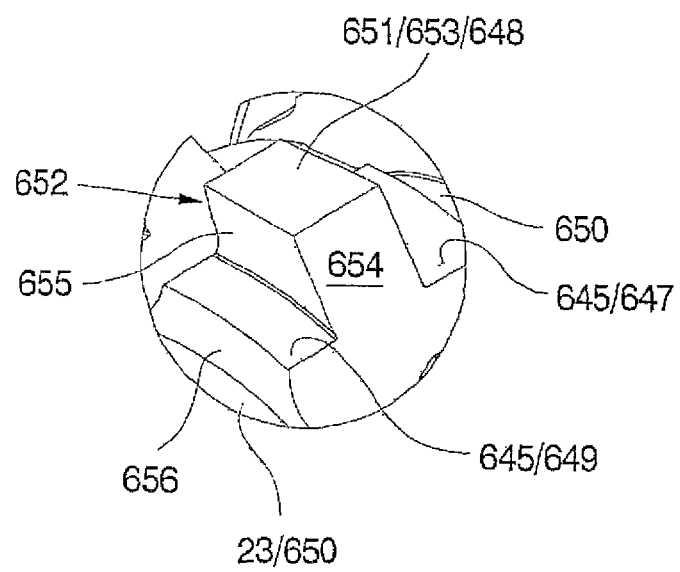
Figure 8B:
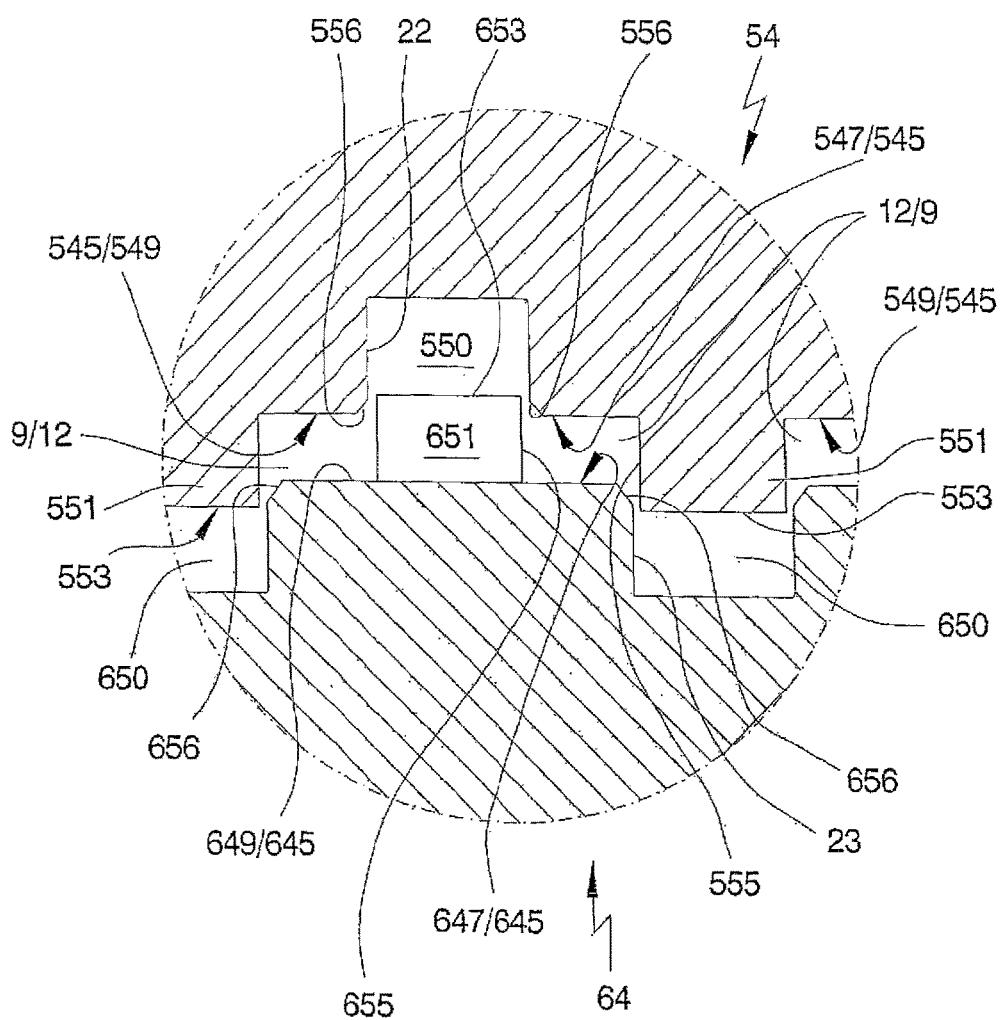

The invention will be more specifically explained, with details, using preferred exemplary embodiments that are shown schematically in drawings but do not restrict the invention. The drawings show:

FIG. 1 a schematic side view of an apparatus according to the invention;

FIG. 1a the apparatus according to FIG. 1 with hollow bodies being fed to it;

FIG. 2 a pressure roller according to the invention in a first exemplary embodiment, in a side view;

FIGS. 2a, 2b, 2c details of the pressure roller according to FIG. 2;

FIG. 3 a pressure roller according to FIG. 1 in interaction with a counter-bearing in the form of a second pressure roller of the same type;

FIG. 3a details regarding FIG. 3;

FIG. 4 a cross-sectional representation of FIG. 3;

FIG. 5 a pressure roller according to the invention in a second embodiment;

FIGS. 5a, 5b, 5c details regarding FIG. 5;

FIG. 6 a counter-bearing in a configuration as a second pressure roller of the second embodiment in interaction with a first pressure roller;

FIG. 6a a cross-section through the pressure rollers according to FIG. 6;

FIG. 7 a perspective view of a second pressure roller of the second embodiment according to FIG. 6;

FIG. 7a detail D of FIG. 7, the cam-shaped projection of the pressure rollers in perspective, and FIGS. 8, 8a, 8b a pressure roller according to the invention in a third embodiment, in different views.

First, it should be stated, before the description, that terms such as "top," "bottom," "left," and "right" relate only to the figures in question and thereby can be different in reality. Also, the proportions can be different from the figures in reality. Furthermore, the figures are not exact technical drawings, but rather are merely intended to show the nature of the invention. With regard to the reference symbols, it must be stated that the same numbers in the different figures always refer to the same components, as well. Reference symbols not mentioned in the description are evident from the reference symbol list or from being mentioned in another figure of this disclosure. The reference numbers referred to in the figures have the same meaning, in each instance, even if they are not explicitly mentioned in the description of the embodiments, with regard to each figure.

A schematic side view of an apparatus having a pressure roller 5 according to the invention and a pressure roller 6 according to the invention is shown in FIGS. 1 and 1a.

A filling opening 3 is provided in a housing 2, on one side, in an upper region, for throwing in the said containers/hollow bodies to be recycled. In the upper inner region, there is a feed space 3a; in the lower region of this housing 2, subsequent to the feed space 3a, the first pressure roller 5 is disposed, and, lying opposite this roller, parallel and at a distance, the counter-bearing 6 is disposed, which, in this embodiment of the apparatus according to the invention, is also a pressure roller according to the invention.

The pressure roller 5 and the counter-bearing 6, here the pressure roller 6, form a gap 9 between them. This gap is simultaneously the intake gap and the working gap. The containers 15, 16, etc. to be compressed are introduced, one after the other, into the feed space 3a, by way of the filling opening 3, and slide, by way of the chute 10, toward the intake gap 9. A driver unit 7 is disposed in the feed space 3a and supports the feed of the containers 15 or 16 that have been thrown in, with one of its vanes 71, 72, or 73, in each instance, which move in the direction of the arrow 11, toward the intake gap 9, whereby these vanes push the container in the direction of the gap 9 and, at the same time, press them against this intake gap, as long as they have contact with the container.

In the representation according to FIG. 1a, it is the vane 73 that presses the container/hollow body 16 against the pressure rollers 5 and 6 and into the intake gap 9. The container 15 that is fed in subsequently is shown in two positions. Once when it is thrown in and then in a later position P, in terms of time; here, the container 15, introduced in the longitudinal direction, is drawn with a broken line for differentiation. It now lies crosswise, in other words parallel to the pressure rollers and the intake gap in its longitudinal orientation, and waits, in this position P, to transfer to the intake gap 9 by means of advancing continued feed along the chute 10 and/or the back of the vane 73. The subsequent vane 72 will then press the container 15 toward the intake gap 9 and into it, as the driver unit continues to rotate about its axis of rotation 70, in the same manner as shown in this figure with regard to the container 16.

Preferably, the driver unit 7 is a separator according to EP 2 292 333 A2 or U.S. Pat. No. 7,540,235 B2.

Not shown here are a gear mechanism and a motor as well as a control unit, which are required for operation of the apparatus and are also provided here, since known modules are used for this purpose.

In FIGS. 2 to 2c, a first preferred embodiment variant of a pressure roller according to the invention is shown, specifically the first pressure roller 5. The fundamental structure of the newly configured pressure roller 5 will be explained using this roller. The working region of the pressure roller 5 is provided between a first end section 502 and a second end section 503 that lies opposite. The axis of rotation of the first pressure roller 5 is indicated with the reference symbol 501. In the working region, the mantle surface 505 of this first pressure roller 5 is essentially cylindrical. The working region, along its cylindrical mantle surface 505, in the axial direction, possesses multiple profiled partial regions 506 disposed next to one another, which have the same width and are of the same type. These profiled partial regions 506 are each spatially separated from one another by means of a circumferential recess 510 present in the base body of the pressure roller 5, in each instance.

Each of these profiled partial regions 506—viewed axially—is divided into multiple sections; into a first section 507, a second 508, and a third 509. At least one of these sections, preferably the second one, the center section 508, possesses at least one cam-shaped projection 511 that projects away radially from the mantle surface 505. Preferably, multiple cam-shaped projections 511 are provided, distributed uniformly on the circumference of each center section 508.

These cam-shaped projections 511 have the shape of a technical tooth. With regard to the details of this tooth-shaped, cam-shaped projection 511, a more detailed explanation will be given below.

The mantle surface 505 of this first pressure roller 5 is configured as a pressure surface in its sections 507 and 509 of each partial region 506; effectively, multiple pressure surfaces having radially the same height are present in the entire working region of the pressure roller 5.

On the right next to FIG. 2, cross-sectional representations corresponding to the cross-section lines F-F and G-G in FIG. 2 are shown in FIGS. 2a and 2b, respectively, in each instance. In FIG. 2a, the cross-section is passed through a section 508. Here, the configuration of the tooth-shaped, cam-shaped projections 511 can be clearly seen. These cam-shaped projections 511 possess a face surface 512, a head surface 513, and a back surface 514—viewed in the direction of rotation 504 of the first pressure roller, see also FIG. 2c.

In FIG. 2b, the cross-section through a section 509 of a partial region 506 is shown. The circumference surface in this section 509 is essentially circular throughout, and forms a circumferential pressure surface, as has already been stated, which interacts with the counter-bearing 6 (see FIG. 1).

It should still be mentioned here that recesses 610 are provided in the counter-bearing 6 for the cam-shaped projections 511, with a corresponding depth and at a corresponding distance (see FIGS. 3 and 3a), which recesses correspond to the circumferential recesses 510.

The cam-shaped projections 511 plunge slightly into these recesses 610 in the counter-bearing 6. In interaction with these recesses 610, the compressed walls of the container 15, 16 are slightly cut and deformed by squeezing when the cam-shaped projections 511 enter into, pass through, and exit from these regions of the counter-bearing 6, so that hooking together of the two walls, which now lie against one another, of the container 17, which has been passed through and pressed flat—see FIG. 1a—occurs.

In FIG. 2c, detail B from FIG. 2 is shown. It is an enlargement, so that the details, which were already described above, are even more clearly evident.

In the preferred exemplary embodiment shown here, according to FIG. 2, the width of the first, left section 507 and of the right, third section 509, in other words the sections having the pressure surfaces, is approximately equal to the width of the center, second section 508, which possesses the cam-shaped projections 511. Specifically, here the width of the sections 507 and 509, in other words the sections having the pressure surface, is about 0.8 times as wide as the center section 508 having the cam-shaped projections 511. In the representation according to FIG. 2c, it is also evident that in this one preferred embodiment variant, each region 506 is structured the same and has the same width. Only in the regions 506 that directly follow the two end sections 502 and 503, respectively, is the edge region of the regions 506 that faces these sections shaped slightly differently.

In FIG. 3, the two new pressure rollers 5 and 6 according to the invention shown in FIG. 1 are shown in further detail and in a longitudinal section along their axes of rotation 501 and 601, respectively. The first pressure roller 5 shown is the first pressure roller according to the invention in FIG. 2. The second pressure roller 6, the counter-bearing, disposed at a parallel axis distance from the first pressure roller 5 in FIG. 3, is a pressure roller in the construction of the first pressure roller 5 according to the invention, only its end sections 602 and 603 are structured differently. Furthermore, this second pressure roller 6, which is shaped in the same manner as the first pressure roller 5 in its working region, was rotated by 180°, with its end sections 602 and 603, so that when the directions of rotation of the two pressure rollers 5 and 6 are opposite, as intended, in an apparatus according to the invention, the face surfaces 512 and 612 of the cam-shaped projections 511 and 611 face in the direction of rotation, in each instance. Furthermore, the regions 506 and 606 of the two pressure rollers are disposed to be offset axially from one another, in such a manner that the cam-shaped projections 511 and 611, respectively, in each instance, can plunge slightly into the circumferential recesses 610 of the second pressure roller 6 or into the circumferential recesses 510 of the first pressure roller, respectively; see in this regard also detail C of FIG. 3, which is shown in FIG. 3a.

The first end section 502 of the first pressure roller 5 and the second end section 603 of the second pressure roller 6, as well as the second end section 503 of the first pressure roller 5 and the first end section 602 of the second pressure roller 6 are held so as to rotate in bearing plates 18 and 19, respectively, in each instance. The bearing plates are disposed in the housing 2. Outside of the bearing plates, transfer elements are disposed on at least one of the aforementioned end sections 502 and 603 or 503 and 602, which elements are driven by a drive/gear mechanism, not shown, of the apparatus for compaction of empty containers according to the invention, with regard to the rotation of at least one of the two pressure rollers 5 and 6 that is to be produced.

Detail C of FIG. 3 is shown in FIG. 3a on an enlarged scale, so that further details of the invention can be seen more precisely. This detail C relates to the active region between the partial regions 506 of the first pressure roller 5 and the partial regions 606 of the second pressure roller 6, the counter-bearing. The interaction of these partial regions is explained in greater detail here, using two partial regions 506 and 606, which lie opposite one another with parallel axes, and axially next to one another. The cam-shaped projections 511 of the first pressure roller 5 plunge into the circumferential recess 610 of the second pressure roller 6 at certain times, during their rotation about the axis of rotation 501. For this purpose, the distance 13—see FIG. 3—between the axes of rotation 501 and 601 is selected in such a manner that the cam-shaped projections 511 of the first pressure roller 5 plunge only slightly into the circumferential recess 610, i.e. these cam-shaped projections 511 plunge into the circumferential recesses 610 only with their slanted surfaces 516. The same situation exists when the cam-shaped projections 611 of the second pressure roller 6 (the counter-bearing) plunge into the circumferential recesses 510 of the first pressure roller. Here, too, the cam-shaped projections 611 plunge into the circumferential recesses 510 of the opposite first pressure roller 5 only with their slanted surfaces 616. In this way, the result is achieved that the overlap region, in other words the meshing region between the cam-shaped projections 511 and 611, respectively, and the edge regions of the circumferential recesses 610 and 510, respectively, is not so that two cutting disks would mesh with one another. When a cam-shaped projection 511 or 611, respectively, plunges into the opposite circumferential recess 610 or 510, respectively, of the opposite pressure roller, section by section cutting into the wall regions of the container passed through between these pressure rollers 5 and 6 takes place, but this cutting with the pressure rollers according to the invention is only slight and not to the extent as is the case with the apparatuses according to the state of the art. Furthermore, in the region of the wall regions that are pressed against one another, which experience a continuing change in direction by being compressed, in other words meander, no sharp bends are therefore present on the sections that have been deflected, in each instance. In this overlap region 9/12, squeezing and slight pulling predominantly takes place in the wall of the container being passed through, which has been compressed in plate-like manner here, in other words has a double wall, and squeezing compaction takes place in the pressure spaces 12 formed in the work gap 9, between the sections (pressure surfaces) 507 and 607 or 509 and 609, respectively, and thereby material tensions in the material of the related wall region of the body 15 or 16 being passed through, which could bring about re-expansion, are eliminated by means of only reduced forming.

The head region of the cam-shaped projections 511 and 611, respectively, which is structured to be planar, the head surfaces 513 and 613, respectively, also act like a pressure roller on the walls (wall regions and bottom region) of the containers 15, 16 being passed through. When a cam-shaped projection 611 plunges into a circumferential recess 510, or when a cam-shaped projection 511 plunges into the opposite circumferential recess 610, first the doubled wall of the container 15 or 16 being passed through is held and squeezed between the slanted surfaces 516 and 616, respectively, and the related edge region of the circumferential recess 510 and 610, respectively, and the walls are pulled against one another by means of the head surface 513 or 613, respectively, of the cam-shaped projection 511 or 611, respectively, which act as a pressure surface and are in effect there at that time. In the center part, in terms of time, of the related cam-shaped projection 511 or 611, respectively, passing through the related circumferential recess 610 or 510, respectively, the walls of the body 15/16/17 being passed through are cut into, in certain sections, but at the same time are also stretched slightly, so that hooking between the cut wall sections and the wall sections adjacent to these, of the container being passed through, occurs. In the last part of passing through, in terms of time, once again holding in place occurs, as has already been described, in the region of the slanted surfaces 616 and 516, respectively, with simultaneous pulling of the wall sections against one another.

In the representation according to FIG. 4, the first pressure roller 5 according to the invention, which interacts with a counter-bearing in the form of a second pressure roller 6 of the same type, is shown in cross-section along the cross-section line Z-Z (see FIG. 3). The gap 9 is formed between the first pressure roller 5 and the second pressure roller 6, which lie opposite one another; this gap is initially an intake gap, then becomes a working gap, and finally is an exit gap.

The two pressure rollers 5 and 6 run in opposite directions, as shown by the arrows 504 and 604. The containers 15, 16 to be compressed are passed to the intake gap 9 by way of the chute 10. The driver unit 7 shown in FIG. 1 presses a container 15 or 16 that has been fed in, with one of its vanes 71, 72, 73, in each instance, in the direction of the intake gap 9, and presses the container down, as long as it is in contact with it, in the direction of the intake gap 9. In FIG. 1a, the container 16 is just being pressed toward the intake gap 9 and into this gap, by the vane 73.

The cam-shaped projections 511 and 611, respectively, of the two pressure rollers 5 and 6 grasp the container 15, 16 at its wall regions and draw it further/deeper into the working gap 9, whereby, as has already been mentioned, the driver vane 71, 72 or 73 of the driver unit 7 that lies against the container and presses it supports this drawing in.

The process, the compression of the fed-in container 15 or 16 then takes place as described in connection with the explanation regarding FIG. 3a. Furthermore, in this representation according to FIG. 4, it can also be seen that at least in the circumferential recesses 610 of the second pressure roller 6, strippers 14 are inserted. These strippers 14 partly engage around the base surface of the circumferential recess 610, so that the container 17, which has been compressed to form a plate-shaped structure—see also FIG. 1a—if it is possibly still adhering to the cam-shaped projections 511 or 611 that act on it, is stripped off, and rotation, in the sense of being carried along on one of the pressure rollers 5 or 6, is thereby prevented. In particular, these strippers 14 act on partial sections of a compressed container, for example a bottle closure that came loose during compression and cutting, and could have become jammed in one of the recesses 510 or 610 or partly between two adjacent cam-shaped projections 511 or 611.

A further possible and also preferred embodiment variant of the pressure roller according to the invention is shown in FIG. 5. This first pressure roller 50 of the second type has a similar structure as the first pressure roller 5 shown in FIG. 2. In addition, in this first pressure roller 50 of the second type, longitudinal grooves 517 having a slight depth are disposed parallel to the axis of rotation 501, in the mantle surface 505 of its working region. These longitudinal grooves 517 run between the back surface 514 of a cam-shaped projection 511, in each instance, and the face surface 512 of the following cam-shaped projection 511. In this way, the result is achieved that the pressure surfaces in the sections 507 and 509, which are present next to the cam-shaped projections 511, are given a pressure edge 518, viewed in the direction of rotation. These pressure edges 518 act, at the same time, as drivers in the intake of the container 15 or 16 to be compressed.

In FIG. 5a, a cross-section of the cross-section line X-X of FIG. 5 is shown. This cross-section lies in a second, center section of one of the partial regions 506, which has the cam-shaped projections 511.

In FIG. 5b, a cross-section along the cross-section line Y-Y in FIG. 5 is shown. This cross-section leads through a section having pressure surfaces, here a third section 509 that lies to the right from a section 508.

In FIG. 5c, detail A from FIG. 5 is then shown enlarged. Here, too, it is clearly evident that the partial regions 506 of the working region of this first pressure roller 50 of the second type, which regions are separated from one another in the axial direction by means of circumferential recesses 510, have the same shape and the same width. Furthermore, here the placement of the longitudinal grooves 517, which passes through the mantle surface 505 in the sections 507 and 509, can be seen even more clearly, so that, viewed on the circumference of such a section 507 or 509, a plurality of pressure surfaces that follow one another and are spaced apart from one another by a slight depression, in each instance, are formed, thereby causing a temporary and slight pressure relief of the compressed wall sections of the container 15 or 16, which sections lie against one another, to occur, section by section, while the container 15 or 16 is being drawn through the working gap 9, and thereby the quality of pressing of the container to form a plate-shaped structure, as a whole, is improved.

In FIG. 6, a further preferred embodiment of the pressure roller according to the invention is shown. Specifically, here the second pressure roller 60, the counter-bearing, is configured in a second manner. Fundamentally, this configuration corresponds to the first pressure roller 50 of the second type, i.e. in this second pressure roller 60 of the second type, multiple longitudinal grooves 617, oriented axially and disposed at a distance from one another, are also provided, which grooves are parallel to the axis of rotation 601. These longitudinal grooves 617 lie between consecutive cam-shaped projections 611, in each instance. These longitudinal grooves 617 also have a slight depth, interrupt the pressure surfaces formed in the sections 607 and 609, so that a plurality of pressure surfaces are disposed in each section 607 and 609, on the circumference of these sections, which surfaces, viewed in the direction of rotation 604, possess a pressure edge 618, in each instance—see FIG. 7a. The function of these pressure edges 618 is the same as that of the pressure edges 518, which was already described above, together with the representations in FIGS. 5 to 5c.

Just like FIG. 4, FIG. 6a shows a cross-section, here through the two pressure rollers 50 and 60 of the second type, here in the cross-section line A-A of FIG. 6. Here, too, it can be seen that the head region of the cam-shaped projections 611 or 511, respectively, plunges only slightly into the opposite circumferential recess 510 or 610, in each instance, of the opposite pressure roller 50 or 60, in each instance, in the region of the gap 9, particularly in its region that forms the working gap. Here, the same also holds true as was already explained in connection with the above description of the embodiment of the invention according to FIG. 3a.

The representation in FIG. 7 shows a perspective view of a second pressure roller 60 of the second type according to FIG. 6. Detail D of this representation, which is shown enlarged in FIG. 7a, shows one of the cam-shaped projections 611, which are provided multiple times, and its details.

Each of these cam-shaped projections 611 is delimited by a face surface 612 in the direction of rotation 604. This face surface 612 does not drop perpendicular toward the axis of rotation 601, but rather is disposed to be inclined slightly counter to the direction of rotation 604, so that here —viewed in terms of cutting technology—a free surface on a cutting edge is essentially formed. On the head side, the cam-shaped projection 611 possesses a head surface 613, which makes a transition, at its end, into a back surface 614, which runs directed radially inward. Laterally, the cam-shaped projection 611 is delimited by side surfaces 615. Bevel-shaped slanted surfaces 616 are disposed on both sides, in the edge region, in each instance, between these side surfaces 615 and the head surface 613. The width of these slanted surfaces 616 is marked with the reference symbol B. According to the invention, the amount of this width B is at least greater than 0.7 mm and preferably greater than 2.5 mm. The edge produced by the slanted surface 616, in each instance, and the side surface 615, in each instance, ends no later than at half the height H indicated in FIG. 7a, however. The angle of inclination of these slanted surfaces 16 is between 45° and 20°, preferably between 40° and 30°, with reference to the perpendicular, in other words viewed radially to the axis of rotation. The side surfaces 615 end at the mantle surface 605 of the sections 609 or 607, inward toward the body. It should also be mentioned that the cam-shaped projections 511 of the first pressure roller 5 and the cam-shaped projections 511 of the first pressure roller 50 of the second type are configured the same, like the cam-shaped projections 611 shown in detail in FIGS. 7 and 7a. Corresponding reference numbers are therefore assigned to the related surfaces on the cam-shaped projections 511, in other words 512 to 516, see also FIGS. 2c, 3a, and 5c.

A further embodiment variant of the invention, of a pressure roller of the third type will be shown and explained below, using the schematic representations of FIGS. 8, 8a, and 8b. This third embodiment of the invention is implemented in a first pressure roller 54 of the third type and also in a second pressure roller 64 of the third type. In FIGS. 8 and 8a, this third embodiment variant of the invention will be explained using the second pressure roller 64 of the third type that is shown. In FIG. 8b, partial regions of the first pressure roller 54 of the third type and second pressure roller 64 of the third type, disposed to lie relative to one another, are then shown, as this was already shown in FIG. 3a with regard to the first pressure roller 5 and the second pressure roller 6.

The representation in FIG. 8 shows a perspective view of a second pressure roller 64 of the third type. Detail E of this representation, which is shown enlarged in FIG. 8a, shows one of the cam-shaped projections 651, of which multiple ones are provided, and its details. Each of these cam-shaped projections 651 is delimited with a face surface 652 in the direction of rotation 644—see FIG. 8. This face surface 652 also does not drop perpendicular to the axis of rotation 641 (see FIG. 8), but rather is disposed slightly inclined against the direction of rotation 644, so that here—viewed in terms of cutting technology—a free surface on a cutting edge is essentially formed. On the head side, the cam-shaped projection 651 possesses a head surface 653, which makes a transition, at its end, into a back surface 654, which runs directed to the inside of the body. Laterally, each cam-shaped projection 651 is delimited by side surfaces 655. Axially to the left and the right of the cam-shaped projections 651, a first section 647 and a third section 649 are provided on the mantle surface 645 in each instance. The second section, which lies between these two sections, in other words the section on which the cam-shaped projection 651 is formed, in each instance, has the reference symbol 648. In this third embodiment variant of the invention, as well, the sections 647, 648, and 649, which lie next to one another, form a partial region 646, in each instance. The second pressure roller 64 of the third type and the first pressure roller 54 of the third type, just like the pressure rollers 5, 6, 50, and 60, according to the invention, possesses multiple partial regions, the partial regions 546 or partial regions 646, respectively, which are disposed next to one another in the axial direction and are spatially separated from one another by means of a circumferential recess 550 or 650, respectively, in each instance.

The bevel-shaped slanted surfaces provided according to the invention are disposed at lower-lying edge regions, in contrast to the pressure rollers 5, 6, 50, and 60, according to the invention, which regions are each formed by one of the side flanks 22, 23 of the circumferential recesses 550, 650, and the adjacent mantle surface 545, 645, in each instance, of the first sections 547, 647 or of the third sections 549, 649, respectively. These bevel-shaped slanted surfaces of the third embodiment of the invention are referred to with the reference symbol 556 or 656, respectively.

With regard to the height and the width as well as the angle of the inclination of these bevel-shaped slanted surfaces, the same holds true as was already explained with regard to the bevel-shaped slanted surfaces 516 and 616 of the pressure rollers 5, 6, 50, and 60, in the above description.

In FIG. 8b, detail C of FIG. 3 is shown with reference to the use of pressure rollers according to the third embodiment. In FIG. 8b, the pressure rollers 54 and 64, which lie disposed relative to one another, are therefore shown in a partial region, specifically in their common region of action.

The interaction of these partial regions is shown in greater detail here, using two partial regions 546 and 646 that lie opposite one another, with parallel axes, and axially next to one another. The cam-shaped projections 551 of the first pressure roller 54 of the third type plunge into the circumferential recess 650 of the second pressure roller 64 of the third type at certain times, during their rotation about the axis of rotation. For this purpose, the distance 13—see FIG. 3—between their axes of rotation is selected in such a manner that the cam-shaped projections 551 of the first pressure roller 54 of the third type plunge only slightly into the circumferential recess 650 of the opposite pressure roller 64, i.e. these cam-shaped projections 551 preferably plunge into the circumferential recesses 650 only to the end of the slanted surfaces 656 of the circumferential recesses 650. The same situation exists when the cam-shaped projections 651 of the second pressure roller 64 of the third type (the counter-bearing) plunge into the circumferential recesses 550 of the first pressure roller 54 of the third type. Here, too, the cam-shaped projections 651 preferably plunge into the circumferential recesses 550 of the opposite first pressure roller 54 of the third type only up to the end of the slanted surfaces 556. In this way, the result is achieved that the overlap region, in other words the meshing region between the cam-shaped projections 551 and 651, respectively, and the edge regions of the circumferential recesses 650 and 550, respectively, is not so that two cutting disks would mesh with one another.

When a cam-shaped projection 551 or 651, respectively, plunges into the opposite circumferential recess 650 or 550, respectively, of the opposite pressure roller 64 or 54, respectively, section by section cutting into the wall regions of the container passed through between these pressure rollers 54 and 64 takes place, but—as has already been explained above—this cutting with the pressure rollers according to the invention is only slight and not to the extent as is the case with the apparatuses according to the state of the art.

The bevel-shaped slanted surfaces 556 or 656 in the embodiment according to the invention act here just like the bevel-shaped slanted surfaces 516 and 616 on the cam-shaped projections 511 and 611 according to the first and second embodiment variant, which were already explained above.

The invention is not restricted to the exemplary embodiment that is shown and has been explained, but particularly also comprises variants that can be formed by combining characteristics or elements described in connection with the present invention. Furthermore, individual characteristics or methods of functioning that have been described in connection with the figures can represent an independent invention when taken by themselves. The applicant therefore reserves the right to claim further characteristics that have only been disclosed in the description until now, particularly in connection with the figures, as essential to the invention. The claims filed with the application are therefore merely formulation suggestions, without prejudice to filing for further patent protection.

An embodiment variant that is not shown, but lies within the scope of the claimed invention, can consist in that the counter-bearing is formed not by a rotating roller, but instead, a roller segment of a corresponding size of a rotating first pressure roller is assigned, forming the said gap 9 (intake gap and working gap). In this embodiment variant, the counter-bearing, the roller segment, is stationary, in other words it does not move.

A further embodiment variant that is not shown, but also lies within the scope of the claimed invention, consists in that the one of the two pressure rollers according to the invention is not disposed turned by 180°, as shown in FIG. 3 and explained above with regard to this figure. In this embodiment variant, the face surfaces of the cam-shaped projections face in the direction of rotation in the case of the one pressure roller, and the back surfaces of the cam-shaped projections face in the direction of rotation in the case of the second pressure roller. This embodiment is selected, depending on the application case, and can be advantageous if the material of the containers to be compressed deviates from the other materials, for example is softer or harder or possesses a different stretching behavior than usual.

A further embodiment variant that is not shown, but also lies within the scope of the claimed invention, consists in that the cam-shaped projections, which can simultaneously be perforation elements, are furthermore configured in such a manner that they are simultaneously clearing elements, which engage into recesses provided in the pressure rollers, and pull out or press out any split-off material that has been wedged in there.

REFERENCE NUMBER LIST 1 apparatus
2 housing
3 filling opening
3a feed space
4 exit opening
5 first pressure rollers
   501 axis of rotation
   502 first end section
   503 second end section
   504 direction of rotation
   505 mantle surface 506 partial regions
507 first section (with pressure surface)
508 second section
509 third section (with pressure surface)
510 circumferential recess (in Item 505)
511 cam-shaped projection
512 face surface
513 head surface
514 back surface
515 side surfaces
516 slanted surfaces (bevels)
50 first pressure rollers of the second kind
  517 longitudinal grooves
  518 pressure edges (simultaneously drivers)
54 first pressure roller of the third kind
  545 mantle surface
  546 partial regions
  547 first section (with pressure surface)
  548 second section
  549 third section (with pressure surface)
  550 circumferential recess (in Item 545)
  551 cam-shaped projection
  552 face surface
  553 head surface
  554 back surface
  555 side surfaces
  556 slanted surfaces (bevels)
6 counter-bearing (second pressure roller)
  601 axis of rotation
  602 first end section
  603 second end section
  604 direction of rotation
  605 mantle surface
  606 partial regions
  607 first section
  608 second section
  609 third section
  610 circumferential recess (in Item 605)
  611 cam-shaped projection
  612 face surface
  613 head surface
  614 back surface
  615 side surfaces
  616 slanted surfaces (bevels)
60 second pressure roller of the second kind
  617 longitudinal grooves
  618 pressure edges (simultaneously drivers)
64 second pressure roller of the third kind
  641 axis of rotation
  642 first end section
  643 second end section
  644 direction of rotation
  645 mantle surface
  646 partial regions
  647 first section
  648 second section
  649 third section
  650 circumferential recess (in Item 645)
  651 cam-shaped projection
  652 face surface
  653 head surface
  654 back surface
  655 side surfaces
  656 slanted surfaces (bevels)
7 driver unit
  70 axis of rotation of Item 7
  71, 72, 73 vanes of Item 7
8 guide plate
9 gap (intake gap and working gap)
10 chute
11 arrow
12 pressure spaces
13 distance between Item 501 and 601 (between the axes of rotation of the rollers)
14 stripper
15, 16 containers (supplied containers, e.g. plastic bottle, beverage can)
17 compressed containers
18, 19 bearing plates
20 side flanks (of Item 510)
21 side flanks (of Item 610)
22 side flanks (of Item 550)
23 side flanks (of Item 650)
P position of the container 15
B width of the bevel-shaped surface (of Item 516 or 616, respectively; 556 or 656, respectively)
H height (of Item 511 or 611, respectively; 551 or 651, respectively)

The invention claimed is:
1. A pressure roller for an apparatus for compaction of empty hollow bodies comprising:
  at least one roller body having an essentially cylindrical mantle surface;
  wherein the essentially cylindrical mantle surface comprises multiple profiled partial regions in a working region of the essentially cylindrical mantle surface,
  wherein the multiple profiled partial regions are of the same width and follow one another in an axial direction, wherein the multiple profiled partial regions are separated from one another by a circumferential recess extending in a plane perpendicular to the axial direction,
  wherein each of the multiple profiled partial regions, viewed along the axial direction, has multiple sections that follow one another,
  wherein at least one cam-shaped projection that projects radially away from the essentially cylindrical mantle surface is disposed in one of the multiple sections of each of the profiled partial regions,
  wherein sections of the multiple sections next to the section having the cam-shaped projection are configured with pressure surfaces of radially the same, constant height, in relation to a center of the roller body,
  wherein the pressure surfaces have a width that is at least half the width of the section having the cam-shaped projection,
  wherein all parts of the cam-shaped projections have a same relative height over the pressure surfaces of the multiple sections next to the sections having the cam-shaped projections,
  wherein either
    an edge region, that is formed by a side flank of the respective cam-shaped projection and the sections next to the section having the cam-shaped projection, is in each instance a beveled surface, which reaches maximally down over a length of up to half of said relative height; or
    an edge region, that is formed by a side flank of the respective circumferential recess and an adjacent section of the multiple sections of the multiple profiled partial regions, is in each instance a beveled surface, which reaches maximally down over a length of up to half of said relative height, and wherein a second roller body of the at least one roller body is arranged such that the cam-shaped projections of the at least one roller body and the second roller body each plunge into the circumferential recess of the second roller body or the at least one roller body, respectively.

2. The pressure roller according to claim 1, wherein multiple cam-shaped projections are uniformly disposed on a circumference of said one of the multiple sections and are respectively in a plane perpendicular to the axial direction.

3. The pressure roller according to claim 2, wherein longitudinal grooves having a depth are disposed parallel to the axial direction, each running between a back surface of one of the cam-shaped projections and a face surface of a following neighboring cam-shaped projection and each passing through the section next to the section having the cam-shaped projections so that the sections next to the section having the cam-shaped projections have a plurality of pressure surfaces that follow one another and are spaced apart from one another by the groove and are respectively in a plane perpendicular to the axial direction, wherein the longitudinal grooves cross several of said multiple regions having the same width in the axial direction.

4. The pressure roller according to claim 1, wherein each profiled partial region has among its multiple sections a first section, a second section, and a third section, which are disposed following one another in the axial direction and next to one another.

5. The pressure roller according to claim 1, wherein each cam-shaped projection is configured in tooth shape in an edge region, toward a side surface of the cam-shaped projection.

6. The pressure roller according to claim 1, wherein each cam-shaped projection is a breaking element for glass bottles.

7. The pressure roller according to claim 1, wherein the one of the edge region that is formed by the side flank of the respective cam-shaped projection and the sections next to the section having the cam-shaped projection, and the edge region that is formed by the side flank of the respective circumferential recess and the adjacent section of the multiple sections of the multiple profiled partial regions, does not have the beveled surface, which reaches maximally down over a length of up to half of said relative height, and is in a plane perpendicular to the axial direction without any beveled surface.

8. The pressure roller according to claim 1, wherein the pressure roller comprises solid material and heat-treated steel, and the essentially cylindrical mantle surface, along with the projecting cam-shaped projections, is surface-hardened.

9. An apparatus for compaction of empty hollow bodies comprising:
at least one pressure roller comprising at least one roller body having an essentially cylindrical mantle surface; and
a counter-bearing, wherein the at least one roller body is disposed at a distance from the counter-bearing, forming a gap,
wherein the essentially cylindrical mantle surface is formed in a working region of the at least one roller body,
wherein each of the at least one roller body possesses multiple regions of the same width, in an axial direction, in the working region,
wherein the multiple regions are separated from one another by a circumferential recess extending in a plane perpendicular to the axial direction,
wherein each of the multiple regions, viewed along the axial direction, comprises multiple sections that follow one another and are separated from one another,
wherein one of the multiple sections comprises multiple cam-shaped projections that project radially away from the mantle surface,
wherein sections of the multiple sections next to the section having the cam-shaped projections are configured with pressure surfaces of radially the same, constant height in relation to a center of the roller body,
wherein the pressure surfaces have a width that is at least half the width of the section having the cam-shaped projection,
wherein all parts of the cam-shaped projections have a same relative height over the pressure surfaces of the multiple sections next to the sections having the cam-shaped projections, and
wherein either
an edge region, that is formed by a side flank of the respective cam-shaped projection and the sections next to the section having the cam-shaped projection, is in each instance a beveled surface, which reaches maximally down over a length of up to half of said relative height; or
an edge region, that is formed by a side flank of the respective circumferential recess and an adjacent section of the multiple sections of the multiple profiled partial regions, is in each instance a beveled surface, which reaches maximally down over a length of up to half of said relative height,
wherein a width of the cam-shaped projections in the axial direction is smaller than a width of the circumferential recesses in the axial direction,
wherein the counter-bearing is at least one second pressure roller in the construction of the at least one pressure roller, and
wherein said at least one pressure roller and said at least one second pressure roller are arranged respectively such that during rotation the cam-shaped projections of said at least one pressure roller and said second pressure roller, respectively, each plunge into the circumferential recesses of said second pressure roller or said at least one pressure roller, respectively.

10. The apparatus according to claim 9, wherein surface sections of each cam-shaped projection interact with the edge region that is formed by the side flank of the respective cam-shaped projection and the sections next to the section having the camp-shaped projections such that squeezing regions, tearing regions, or cutting regions are formed on wall regions of the hollow bodies being passed through.

11. The apparatus according to claim 9, wherein longitudinal grooves having a depth are disposed parallel to the axial direction, each running between a back surface of one of the cam-shaped projections and a face surface of a following neighboring cam-shaped projection and each passing through the sections next to the section having the cam-shaped projections so that the sections next to the section having the cam-shaped projections have a plurality of pressure surfaces that follow one another and are spaced apart from one another by the groove and are respectively in a plane perpendicular to the axial direction, wherein the longitudinal grooves cross several of said multiple regions having the same width in the axial direction.

12. The apparatus according to claim 9,
wherein the cam-shaped projections plunges into the circumferential recesses by at most half of said relative height, respectively.

13. A method of forming an apparatus for compaction of empty hollow bodies, having at least one pressure roller disposed at a distance from a counter-bearing, forming a gap, comprising the following steps:
providing the pressure roller comprising a single and continuous mantle surface in an axial direction,
forming the single and continuous mantle surface of the pressure roller in a working region of the pressure roller so that the at least one pressure roller possesses multiple regions having the same width, in an axial direction, in the working region of the pressure roller, separating the multiple regions from one another by a circumferential recess extending respectively in a plane perpendicular to the axial direction, and wherein each of the multiple regions, viewed along the axial direction, has multiple sections that follow one another and are spaced apart from one another,
forming on one of the multiple sections in each of these multiple regions multiple cam-shaped projections that project radially away from the single and continuous mantle surface,
forming on sections of the multiple sections next to the section having the cam-shaped projections pressure surfaces of radially the same, constant height in relation to a center of the roller body, wherein the pressure surfaces have a width that is at least half the width of the section having the cam-shaped projection, and
placing the pressure roller at a distance to the counter-bearing with the gap there between as a device for comminution of hollow bodies made of glass, which correspond to a beverage container in terms of their shape and size,
wherein all parts of the cam-shaped projections have a same relative height over the pressure surfaces of the multiple sections next to the sections having the cam-shaped projections,
wherein before placing the pressure roller one of the following step takes place:
forming a beveled surface on an edge region formed by a side flank of the respective cam-shaped projection and the sections next to the section having the cam-shaped projection, which reaches maximally down over a length of up to half of said relative height; or
forming a beveled surface on an edge region formed by a side flank of the respective circumferential recess and an adjacent section of the multiple sections of the multiple profiled partial regions, which reaches maximally down over a length of up to half of said relative height,
wherein the counter-bearing is at least one second pressure roller in the construction of the at least one pressure roller, and
wherein said at least one pressure roller and said at least one second pressure roller are arranged respectively such that during rotation the cam-shaped projections of said at least one pressure roller and said second pressure roller each plunge into the circumferential recesses of said second pressure roller or said at least one pressure roller, respectively.

14. The method according to claim 13, wherein before placing the pressure roller the following step takes place:
forming longitudinal grooves in the single and continuous mantle surface having a depth are disposed parallel to the axial direction, each running between a back surface of one of the cam-shaped projections and a face surface of a following neighboring cam-shaped projection and each passing through the sections next to the section having the cam-shaped projections so that the sections next to the section having the cam-shaped projections have a plurality of pressure surfaces that follow one another and are spaced apart from one another by the groove and are respectively in a plane perpendicular to the axial direction, wherein the longitudinal grooves cross several of said multiple regions having the same width in the axial direction.

* * * * *